US 7,164,361 B2

(12) United States Patent
Poliska

(10) Patent No.: US 7,164,361 B2
(45) Date of Patent: Jan. 16, 2007

(54) SYSTEM AND METHOD FOR COLLECTING, PROCESSING AND MANAGING LIVESTOCK DATA

(75) Inventor: Steven A. Poliska, Rockaway, NJ (US)

(73) Assignee: Schering-Plough Animal Health Corporation, Summit, NJ (US)

( * ) Notice: Subject to any disclaimer, the term of this patent is extended or adjusted under 35 U.S.C. 154(b) by 108 days.

(21) Appl. No.: 10/403,240

(22) Filed: Mar. 31, 2003

(65) Prior Publication Data

US 2005/0258967 A1 Nov. 24, 2005

(51) Int. Cl.
G08B 23/00 (2006.01)
(52) U.S. Cl. .................... 340/573.3; 119/51.02
(58) Field of Classification Search ........... 340/573.3, 340/573.1; 119/51.02; 600/300
See application file for complete search history.

(56) References Cited

U.S. PATENT DOCUMENTS

| 4,288,856 A | | 9/1981 | Linseth ..................... 364/567 |
|---|---|---|---|
| 4,712,511 A | * | 12/1987 | Zamzow et al. ......... 119/51.02 |
| 5,008,821 A | * | 4/1991 | Pratt et al. .............. 119/51.02 |
| 5,499,626 A | * | 3/1996 | Willham et al. ........... 600/300 |
| 5,673,647 A | | 10/1997 | Pratt ....................... 119/51.02 |
| 5,757,647 A | * | 5/1998 | DeMichele ................. 700/95 |
| 5,816,191 A | * | 10/1998 | Beaudoin et al. ....... 119/51.02 |
| 6,000,361 A | | 12/1999 | Pratt ....................... 119/51.02 |
| 6,032,084 A | * | 2/2000 | Anderson et al. .......... 700/241 |
| 6,211,789 B1 | * | 4/2001 | Oldham et al. .......... 340/573.3 |
| 6,329,920 B1 | | 12/2001 | Morrison et al. ........ 340/573.3 |
| 6,342,839 B1 | * | 1/2002 | Curkendall et al. ...... 340/573.3 |
| 6,346,885 B1 | * | 2/2002 | Curkendall .............. 340/572.4 |
| 6,470,825 B1 | * | 10/2002 | Johnson et al. .......... 119/51.02 |
| 6,664,897 B1 | * | 12/2003 | Pape et al. ................ 340/573.3 |
| 6,684,810 B1 | * | 2/2004 | Martin ...................... 119/51.02 |
| 6,793,127 B1 | * | 9/2004 | Alsafadi et al. ............ 235/375 |
| 2002/0010390 A1 | * | 1/2002 | Guice et al. ................ 600/300 |
| 2002/0054130 A1 | * | 5/2002 | Abbott et al. ............... 345/783 |
| 2003/0213844 A1 | * | 11/2003 | Yoshida et al. ............. 235/383 |

FOREIGN PATENT DOCUMENTS

WO    WO 99/45761    9/1999

OTHER PUBLICATIONS

AgInfolink Inventory 2000 Report; AgInfolink Global, Inc; www.aginfolink.com/new_documents/inventory_reports.pdf.*
AgInfolink, Beeflink; AgInfolink Global, Inc; 2005; www.aginfolink.com/prod_beeflink.asp.*

* cited by examiner

Primary Examiner—Jeffery Hofsass
Assistant Examiner—Anne V. Lai
(74) Attorney, Agent, or Firm—Lowenstein Sandler PC

(57) ABSTRACT

An animal is provided with an identifier for uniquely identifying it. The identifier is entered into a microprocessor-controlled programmable device to start a record for the animal and to record and store information pertaining to the animal into the record. After the recording and storing of information, an electronic unit is activated to indicate to an animal handler a next task to be performed related to the animal. The data may be entered by speech commands and voice recognition software, so that the user can avoid coming into close proximity to the animal. Further, the contents of the record can be processed to provide information to those along the chain from the producers to the feedlots, packing plant and wholesalers/retailers that will assist in the production of a better product.

23 Claims, 4 Drawing Sheets

SYSTEM AND METHOD FOR COLLECTING, PROCESSING AND MANAGING LIVESTOCK DATA

BACKGROUND OF THE INVENTION

This invention relates to a system and method for collecting, processing and managing livestock data, e.g., data related to cattle and, more particularly, to visible tags of individual animal identifiers, displays for displaying the animal identifiers and other signs, devices for inputting animal-related data into an electronic system, data warehousing and management systems located on a local or wide area, global computer network such as the Internet, web sites for entering and displaying animal-related information, and algorithms for processing animal-related data to produce useful information such as predictive modeling.

The U.S. cattle industry comprises several vertically integrated segments, such as producers, feedlots, packing plants, wholesalers/retailers. The cattle industry cycle starts with the commercial cattle producers maintaining herds of cows that are used to produce calves. The calves are grown to a certain size and then moved to feedlots where tens of thousands of head of cattle or other ruminants are cared for in various stages of growth. In the feedlots, the ruminants are fed a special diet to reach their optimum weight and size while trying to keep the animals healthy. Subsequently, the animals are sent to the packing plants for slaughter and cutting of the carcasses into various cuts of meat. These cuts of meat are packed, chilled and shipped by the packers to the wholesalers/retailers for distribution to the public.

The goal at each cattle industry segment is to promote efficiency and optimize its operation. Each vertical segment, however, does not have access to animal-related data of another vertical segment up and down the stream of commerce. Complicating matters even further is the sheer number of participants in the industry: there are a large number of producers, feedlot operators, packing plant operators, and wholesalers/retailers. For example, a feedlot operator receives calves from a large number of producers and would prefer to keep track of individual, as well as group, ownership.

A need, therefore, exists for a system and method for efficiently, safely and accurately collecting animal-related data, managing cattle to obtain maximum economic return at each vertical industry segment, optimally using the accumulated data for each animal, and providing access to animal-related data obtained at each industry segment to allow for informed decision-making strategies.

SUMMARY OF THE INVENTION

It is an object of the present invention to provide a system and method for managing livestock information.

It is another object of the present invention to provide a system and method for managing livestock information using a tag, a microprocessor-controlled programmable device, and an electronic display unit The present invention is directed to providing a system and method for managing livestock information. The system and method use a tag, a microprocessor-controlled programmable device, and an electronic display unit for easily determining the individual identities of animals marked with the tag and creating an electronic record thereof.

According to the present invention, an animal is provided with a unique identifier that is entered into a microprocessor-controlled programmable device to start a record for the animal and to record and store information pertaining to the animal into the record. After the recording and storing of information, an electronic unit is activated to indicate to an animal handler a next task to be performed related to the animal.

In an illustrative embodiment, the present invention includes a system and method for allowing a person involved in cattle production and processing cycles to uniquely identify an animal with an electronic identification unit, collect data on various events and characteristics of the animal, such as feeding, health, weight, etc., manage the collected data and process it into reports for various segments of the industry. The system includes an identifier for uniquely distinguishing an animal, for examples a tag comprised of an electronic transponder that emits a signal unique to the animal. Alternatively, the tag may be entirely non-electronic, for example a plate with a large alphanumeric number which uniquely identifies the animal through a visual inspection.

Further included in the present system and method is a large electronic device for indicating a next task to be performed by an animal handler. One example of the electronic device is a display device for displaying alphanumeric characters. In addition, the present system and method includes a computer for receiving, processing and sending the records via a communications link. In particular, information about a particular animal, as well as any other livestock data, is entered into the computer through any data entry device, and then forwarded to a remotely located back-end server and database for document management, statistical processing of information, report generation, etc.

In operation, the cattle producer uses a PDA with an RF reader to read a unique identification number assigned to an animal from its tag. Alternatively, the number can be manually entered into the PDA when the user visually reads the information from the tag. The information in the PDA is transmitted to the electronic display device for displaying the unique animal's identifier. Once the animal's identifier is displayed as an alphanumeric number, the cattle producer enters this number into the computer by way of voice activation, keyboard or any other input means as known to those skilled in the art. A record can then be created corresponding to each animal, whereby each record contains various pieces of information pertaining to the animal, such as its weight, medical history (vaccinations and medications), etc. The records are then communicated to the portal via the Internet for document management, statistical processing of information, report generation, etc.

It will be appreciated that the large display device is used not only for displaying the animal's identifier, but also as an indicator of multiple tasks to be performed by one or several members of the crew at the ranch. As an example, when an animal is being inoculated, it may be held in a pen. After the inoculation, the display unit may display the word "GO" when the inoculation data has been entered into the computer. As the result, the animal handler at the working chute environment is given clear instructions from a member of his crew on how to proceed next. Among other things, the large display device obviates the need for shouting the instructions or physically communicating them among the members of the animal handling team, etc.

BRIEF DESCRIPTION OF THE DRAWINGS

The foregoing and other features of the present invention will be more readily apparent from the following detailed description and drawings of one or more illustrative embodiments of the present invention in which.

DETAILED DESCRIPTION OF EMBODIMENTS

Figure 1:
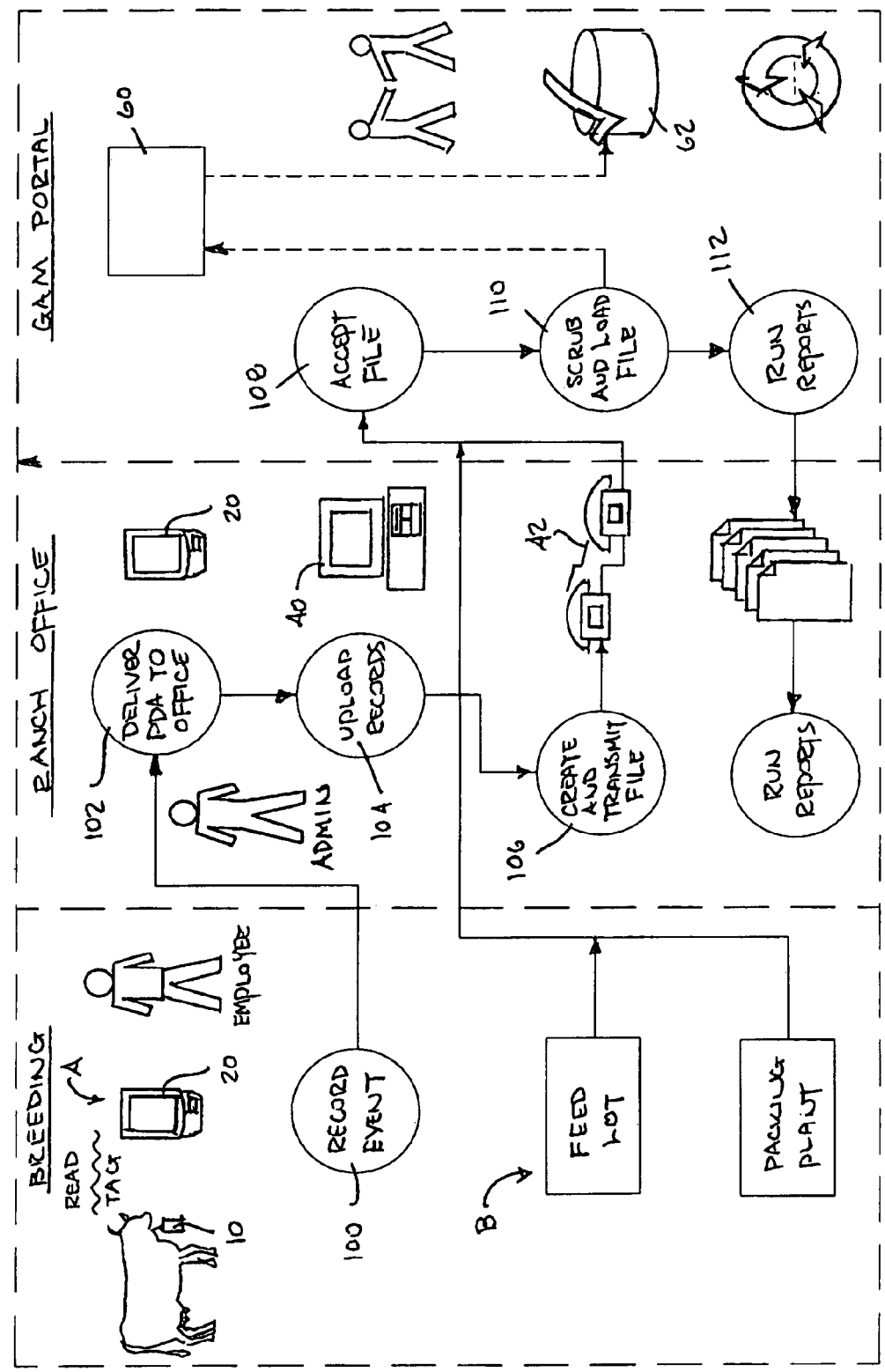
FIG. 1 is a diagram of the overall system and method according to the present invention.

As a general overview, the present invention includes a system and method for allowing a person involved in cattle production and processing cycles to uniquely identify an animal with an electronic identification unit, collect data on various events and characteristics of the animal, such as feeding, health, weight, etc., manage the collected data and process it into reports for various segments of the industry. The system includes an identifier for uniquely distinguishing an animal.

An exemplary identifier is a tag comprised of an electronic transponder that emits a signal unique to the animal. Such an exemplary electronic tag is described in detail in U.S. Pat. No. 5,315,505 and manufactured by Allflex International. Alternatively, the tag may be entirely non-electronic, made from rubberized plastic or some other resilient material with a large alphanumeric number written thereon to uniquely identify the animal through a visual inspection. Regardless of the type, the tag is attached to an animal's ear for relatively easy access.

Further included in the present system and method is a personal digital assistant device (PDA) modified to receive the signal emitted by an electronic tag. As known to those skilled in the art, a typical PDA has a memory unit for storing data entered into the device. That is, signal data emitted by an electronic tag is received by the PDA and processed into information records corresponding to each animal. Further included in the present system and method is a large electronic device for indicating a next task to be performed by an animal handler. One example of the electronic device is a display device for displaying alphanumeric characters. The display device, visible at large distances, may be LCD, LED, plasma, CRT, or any other technology known to those skilled in the art. In addition, the present system and method includes a computer (desktop, laptop, portable, etc.) for receiving, processing and sending the records via a communications link, such as the Internet, LAN/WAN, etc. Information about a particular animal, as well as any other cattle data, is entered into the computer through any data entry device, such as a keyboard, touch screen, voice recognition, etc, and then forwarded to a remotely located back-end portal. The portal comprises a server and database for document management, statistical processing of information, report generation, etc.

In operation, the cattle producer uses the PDA to read a unique identification number assigned to an animal. In particular, the cattle producer brings the PDA within a pre-selected close proximity of the tag attached to the animal. Energized by the PDA, the electronic tag emits a radio frequency (RF) signal that uniquely identifies the particular animal. The RF signal is received by the PDA, processed to extract the required information, and then converted and formatted into a digital or analog signal for further re-transmission. This re-formatted information-carrying signal is transmitted to the electronic display device for displaying the unique animal's identifier. Once the animal's identifier is displayed as an alphanumeric number, the cattle producer enters this number into a computer by way of voice activation, keyboard or any other input means as known to those skilled in the art. A record can then be created corresponding to each animal, whereby each record contains various information pertaining to the animal, such as its weight, medical history (vaccinations and medications), etc. The records are then communicated to the portal via the Internet for document management, statistical processing of information, report generation, etc.

Alternatively, the cattle producer may uniquely identify each animal by simply reading the alphanumeric number off the non-electronic tag when the producer uses such a tag at the ranch. The visually identifiable number on the tag is then entered into the computer and transmitted to the portal for document management, statistical processing of information, report generation, etc.

It will be appreciated that the large display device is used not only for displaying the animal's identifier, but also as an indicator of several concurrent data strings or as an indicator of multiple tasks to be performed by one or several members of the crew at the ranch. As an example, when a signal from the RF tag is detected, the animal's identifier is displayed as an alphanumeric number and, at the same time, its weight is indicated on the display device in response to the activation of the scales. The identifier and weight can then be entered into the system to create a record, as described above. In addition, other livestock information may be displayed along with the animal identifier. Among other things, the large display device obviates the need for sequential processing of data. As another example, the display unit may display "GO" after the inoculation data is entered into the computer after the animal has been inoculated. As the result, the animal handler at the working chute environment is given clear instructions from a member of his crew on how to proceed next. Among other things, the large display device obviates the need for shouting the instructions or physically communicating them among the members of the animal handling team, etc.

It will be also appreciated that the electronic device may be one or more indicating lights, without any capability to display an alphanumeric In this embodiment, the light may turn "green" to indicate "GO" when an animal task is completed, for example. Alternatively, the light may turn "red" to indicate "STAY" so that an animal handler may perform the next task on the animal in the chute.

It will be further appreciated that the electronic device may generate one or more distinct sounds as indicators of tasks to be carried out next. In this embodiment, one distinct sound may indicate "GO" when an animal task is completed and the animal is ready to be moved from the chute, while another sound may indicate "STAY" for the next task so that an animal handler may perform the next task in the chute.

Figure 2:
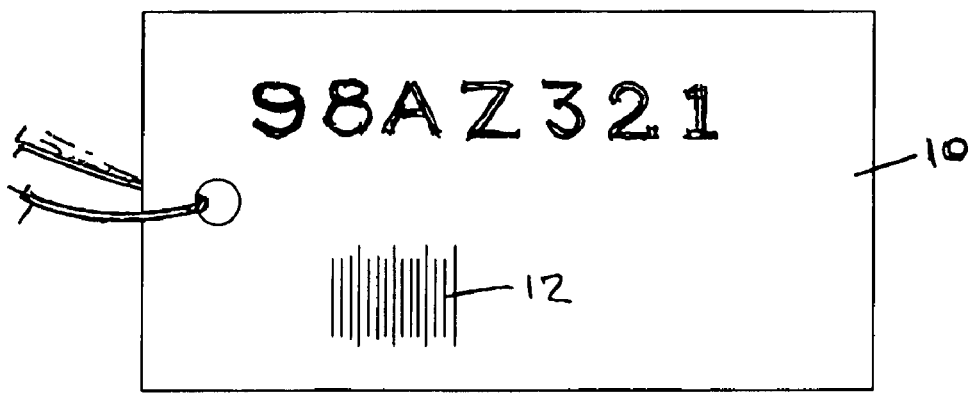
FIG. 2 is an illustration of an animal tag according to the present invention.
Figure 3:
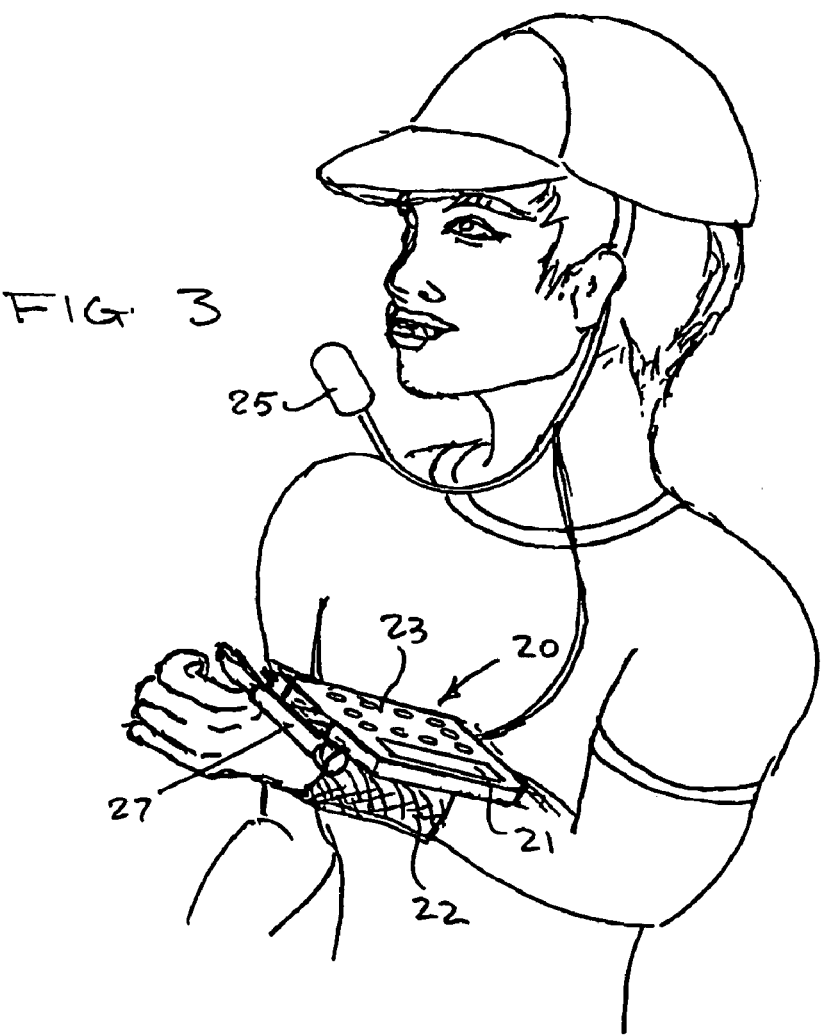
FIG. 3 is a diagram of a microcomputer for use in practicing the present invention.

Referring now to the drawings, FIG. 1 is a diagram of the overall system and method of the present invention. In the field, e.g., at a breeding farm A, animals are individually identified at birth with a tag 10, such as that shown in FIG. 2. The tag 10 has large alphanumeric characters that form a unique identifier (ID) for the animal, which can be read from a reasonable distance. A user or employee then creates an electronic record of the animal's birth using a portable microprocessor-controlled programmable device 20 by entering the animal's unique identifier into the device 20. The device 20 may be, for example, a personal digital assistant, such as a palm pilot, or a portable computer, such as an IBM Thinkpad having an operating system and one or more programmable controllers. As shown in FIG. 3, the device 20 has a display 21 and a keyboard 23. For the sake of convenience, the device 20 may have a strap 22 by which it may be fastened to the wrist or forearm of the user. As shown in FIG. 3, the device 20 is fastened to the left forearm of the user, so that the finger of the right hand is free to type on the keyboard. Thus, the employee or user reads the identifier from the tag 10 and manually enters it into the device 20 using the keyboard 23.

As an alternative, the device 20 may be equipped with speech recognition software and hardware as known to those skilled in the art, and a microphone 25 connected to the device 20. By articulating the numbers and/or letters on the tag 10, the user can input the identification information as part of the creation of an electronic record for the animal as part of step 100 indicated in FIG. 1.

In a still further embodiment, the tag 10 may have a bar code 12, which represents the identifier, and the device 20 may be equipped with a bar code reader 27. Thus, the user may swipe the bar code to enter the information. Naturally, with this method, the user must get close to the animal to record its identifier.

Among other things, it is an advantage of the present invention that the identifier can be read from a distance. This reduces the risk of injury to the user, e.g., from an animal that may be sick and undergoing an annoying treatment. The visual tag also has an advantage over conventional radio frequency (RF) tags, which may rely on stationary detectors, such as those attached to squeeze chutes. In particular, the identifier on the visual tag may be recorded in the system when the animal is in any location and not just in proximity to the stationary RF detector. Further, the information obtained by the stationary RF detectors must be transferred to the database, which most likely is remote. Also, the stationary RF detectors are somewhat sensitive and are subject to damage when used in a harsh environment, e.g., on a cattle ranch. Some of these disadvantages with RF tags may be overcome by the use of portable detectors. However, all RF tags must be in relatively close proximity to an RF detector before the tag can be read, which is not the case with the visual readings of the present invention, so the danger of injury is not avoided. Further, the sensitive detectors must still operate in a harsh environment, even if made portable.

To the extent that RF tag and reading equipment is in use, it can be integrated into the present system. In particular, the RF signal can be read by this equipment if it is in close proximity to the tag and the ID can be sent to the large display, rather than reading the identifier and sending the ID directly to the system. Once the ID is shown on the large display unit, it can be entered into computer 20 by voice recognition or manually as described above. As also described above, the large display unit is used as an indicator of several concurrent data strings or as an indicator of multiple tasks. Once the animal's identifier is input into the device 20, additional elements of the animal record can be input as a continuation of step 100 of FIG. 1. With respect to a newborn animal, this can include birth weight, sex, dimensions, sire and dam. This information can be manually entered by the keyboard 23 or dictated using the microphone 27. Further, certain instruments, such as scales, may be equipped with an electronic readout that can be coupled to the device 20, so that a characteristic of the animal is automatically recorded.

After the record of the animal is initially created, it can be updated either periodically or upon the occurrence of a special event. For example, every week the animal can be weighed and the date and its new weight recorded in the record. Also, the system can be used to record the type of nourishment the animal is receiving. This may provide significant subsequent information that correlates feeding with weight gain and perhaps the degree to which the ultimate meat product is lean or fatty.

While the information is collected on the device 20, on a regular basis, perhaps daily, depending on the number of animals processed and the storage capacity of the device 20, the information is transferred to a larger computer 40 shown in FIG. 1, which may be located in an office on the ranch. In fact, a number of workers may use these portable devices to record information in step 100 on the same or different animals. Then the devices may be brought to the office in step 102. Information from each of the portable devices may be transferred to the office computer 40 in step 104.

In the office computer, the records are assembled, and in step 106 the data may be transmitted, e.g., by modem 42 or other communications device, such as a network card over a wired or wireless network, to the Internet Service Provider, and then over the Internet or other network to a Global Animal Management (GAM) server that hosts the web site portal 60. At step 108 the data is accepted and then in step 110 the data is cleaned or scrubbed, and loaded into a central database 62 that is maintained by the GAM server. As shown in FIG. 1, the information in the database 62 can be used in step 112 to run reports that may be supplied back to a user to aid in the animal management decisions.

An animal, after several weeks at the breeding ranch, is transferred to a feedlot to increase its weight in preparation to sending it to market. The price the feedlot will pay for an animal depends on many factors, e.g., gross weight and percentage fat. Thus, as shown in FIG. 1, each animal according to the present invention, or at least a representative sample is measured to determine its status. Information from the GAM portal can thus be used to produce animals that provide a maximum profit to the breeder, the feedlot operator, etc.

Figure 4:
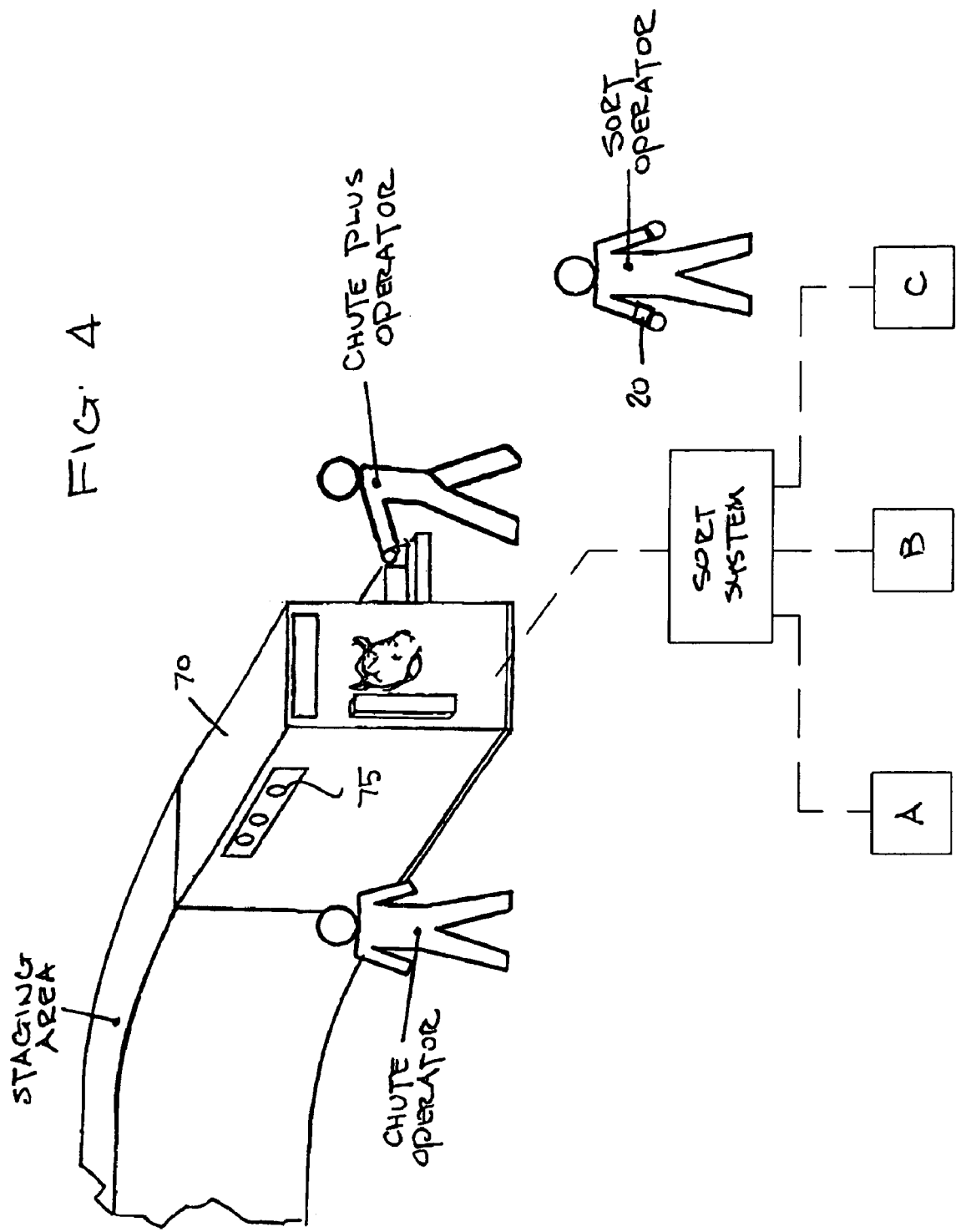
FIG. 4 is an illustration of a squeeze chute in a feedlot according to the present invention.

As shown in FIG. 4 the feedlot may have squeeze chutes 70 in which an animal is located for measurements and procedures. The animal enters the back of the chute as shown in the drawings and has its head extend out the front, where it is clamped in place. Immobilized in this way, the animal's weight, body fat, etc. can be measured. The chute operator or another employee may have the computer 20 and can record information about the animal and associate it with the animal's unique identifier. This can be done manually using the keyboard or by voice recognition. One of the indicators 75 displays the weight of the animal, so it can be input in the same manner. As an alternative, the weight information may be transferred from the chute to the computer by wire or wirelessly. If RF tags are used, the readout can be displayed on the display unit 72 so that the person operating the computer can input the identifier, even if he or she is not physically close to the chute or animal. A release indicator 77 has colored lights (red, yellow, green) that indicate whether the animal is being held or is about to be released.

While in the chute, not only can the animal be measured, but also medications can be administered to the animal. This may be routine inoculations or medications prescribed for a condition of the specific animal. When the testing and processing are completed, the animal is released from the chute. However, based on the results, the animal can be sorted into one of a number of locations by a sort system 74, which may be a multi-position gate leading to several different animal pens A, B, C. The chute may also include sort indicators 79 in the form of letters, which indicate the pen to which the animal will be released.

Figure 5:
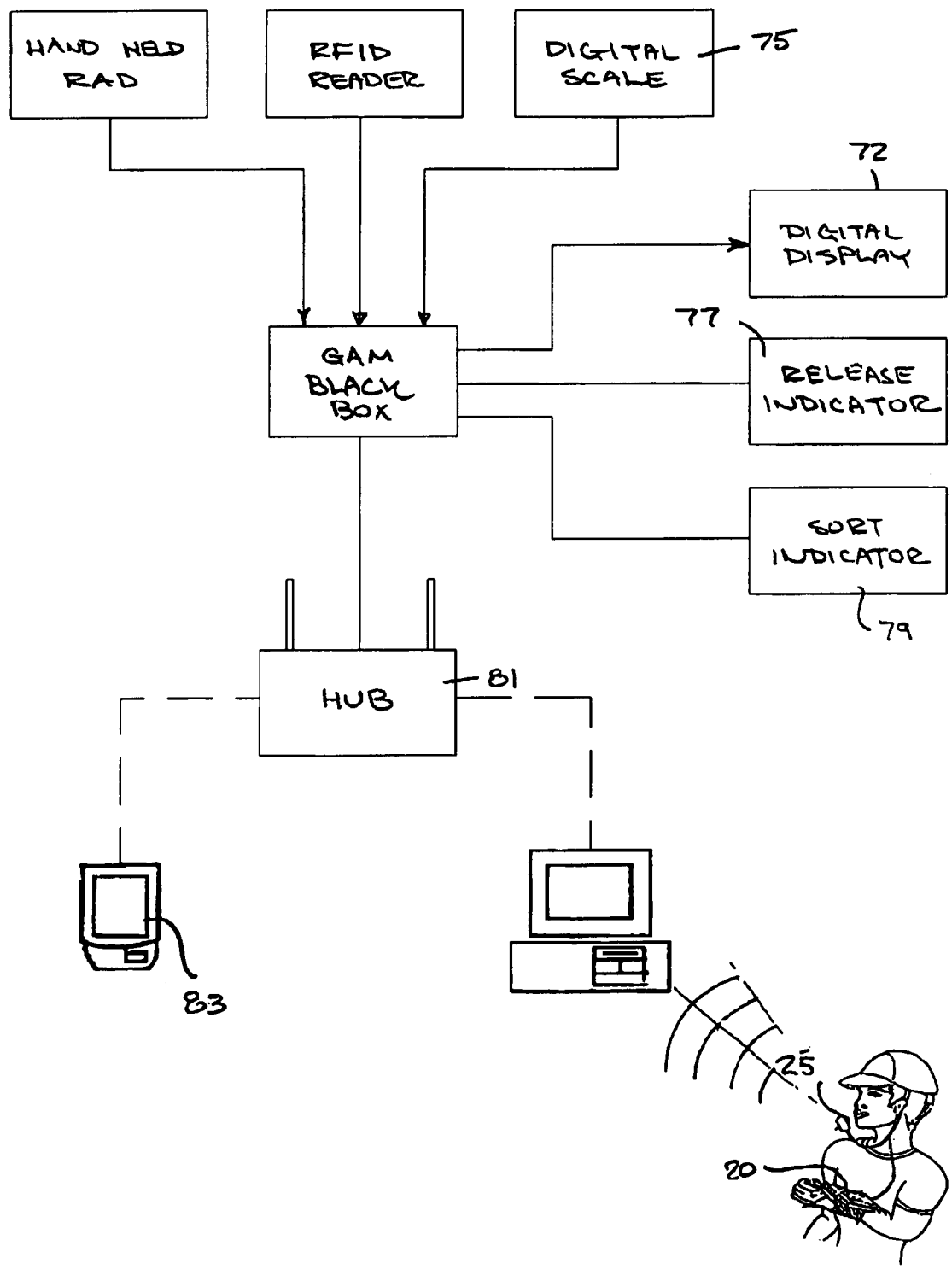
FIG. 5 shows the details of an embodiment of the system operation at the feedlot or other convenient location.

FIG. 5 shows the details of an embodiment of the system operation at the feedlot or other convenient location. This system has the portable device 20 and the microphone 25 as the means for inputting information about an animal into its unique record. This data is collected at a central Hub 81. A PDA 83 used for the same purpose of entering information about an animal, or perhaps a more limited purpose, can also provide information to the Hub 81. The display unit 72 and the digital display of the animal's weight 75 are connected to a GAM data accumulator box 82, as is the Hub 81. The release and sort indicators 77,79 are also connected to the GAM box 82.

The GAM box 82 is designed to communicate data strings between digital devices (i.e., scales, RFD readers, digital displays and light indicators). In this manner, any available data can be integrated to provide a complete record of the treatment of the animal. Thus, the data from the feedlot B in FIG. 1 can be collected and sent over the Internet to the database 62. Subsequent stages in the production of the ultimate meat product include slaughter house/packing plant. Animals records can continue into that process where grading of the meat is conducted. Using the device 20 and the tag 10, the animal can be tracked to the point of producing various meat products having various grades. This information is likewise sent over the Internet to the database 62. As a result, an individual animal is tracked from birth to slaughter, with information on its progress in terms of weight and fat content, along with genetic information about the animal and information about how it was processed, e.g., the feed it was given and how long, medications it received, etc.

The data in database 62 (FIG. 1) may be analyzed to make predictions about the effect of various operations on the animals, as well as the characteristics of the animals, in order to maximize the profit at each vertical segment of the supply chain, or at least with respect to the ultimate meat product. This can be done by manually reviewing the data. However, the results can be made more accurate and can be obtained faster by subjecting the data to an electronic process analysis with an appropriate algorithm.

Subscribers to the system, which may be producers, feedlot operators, packing plant operators, wholesalers/retailers, etc., can use the Internet or other network to access the data in the database 62 and to get the system to run individualized reports for them as shown in step 114 in FIG. 1. The subscriber gets to use the data warehouse, which is optimized for on-line analytical (OLAP) processing of data. In addition, not only is animal data stored here as described above, the subscriber can store other electronic documents on the database 62, e.g., Excel spreadsheets or word processing documents. These are controlled by document management software running on the server 60 that controls the database 62. The system further permits electronic collaboration on these documents via the Internet using e-mail and web browsers.

The report creation software at the GAM portal server 60 allows subscribers to query the database as desired. However, data from unrelated subscribers can be partitioned so that one subscriber will not have access to the data, reports and documents or other subscribers. The subscriber can create charts, aggregate data, perform mathematical calculations and determine details in support of summary information. Some of the mathematical calculations can involve mining of the data and profile analysis to detect patterns and correlations using statistical models.

The main portal page for the website, i.e., MyGAM 2.0, has links to other web pages and includes application programs that may be executed by clicking on the following screen "buttons" or "tabs". Some of the representative pages are:

HOME Main Web Page (home page)
Data Mgmt—Web Page for uploading data
Admin—Web Page for managing passwords and users in organization
TASK—Web Page for managing and querying tasks specific to the development of MyGAM and BeefMetrix (GAM use only)

A security protocol is provided for the web site. In particular, by logging into MyGAM 2.0, the subscriber's profile is checked for authentication. Further, all applications that run in the portal support "single sign-on". This means that the subscriber signs into the portal one time, and can navigate to all linked applications without having to manually sign onto them. The portal simply takes care of it for the user.

It will be appreciated that the livestock information, as used in this disclosure, is understood to mean information on animal location, animal ownership, animal practices, animal health, animal movement, animal intake, animal carcass, animal byproduct, animal welfare, as well as other animal information, as known by those skilled in the art of animal management.

It will be also appreciated that the identifier, as used in this disclosure, is understood to mean a tag, either plastic or electronic, tattoo, implantable device, or any other marker that uniquely identifies an animal or a group of animals.

While the present invention has been described and illustrated in connection with the above embodiments, many variations and modifications, as will be evident to those skilled in the art, may be made without departing from the spirit and scope of the present invention. The present invention is thus not to be limited to the precise details of methodology or construction set forth above, as such variations and modifications are intended to be included within the scope of the present invention.

What is claimed is:

1. A method for managing livestock information comprising:
   providing a live animal with a unique identifier;
   entering said identifier into a microprocessor-controlled programmable device to start a record for said live animal;
   recording and storing said information pertaining to said live animal into said record;
   processing said information to create a task to be performed next on said live animal; and
   indicating the task to be performed next on said live animal to an animal handler by displaying data strings on a display device.

2. The method of claim 1, wherein said identifier visually identifies said live animal and does not contain any electronic or electrical components.

3. The method of claim 2, wherein the step of entering comprises speaking said identifier into said microprocessor-controlled programmable device comprising a microphone and speech recognition software, such that the spoken identifier is converted into computer-accessible information and stored in said microprocessor-controlled programmable device to start said record for said live animal.

4. The method of claim 2, wherein the step of entering comprises inputting said identifier into said microprocessor-controlled programmable device using a keyboard or other input device.

5. The method of claim 1, wherein said identifier is comprised of an electronic transponder for supplying an alphanumeric number in response to radio frequency excitation.

6. The method of claim 5, further comprising displaying said alphanumeric number on said display device for entering into said microprocessor-controlled programmable device.

7. The method of claim 6, wherein the step of entering comprises speaking said alphanumeric number into said microprocessor-controlled programmable device comprising a microphone and speech recognition software, such that the spoken alphanumeric number is converted into computer-accessible information and stored in said microprocessor-controlled programmable device to start said record for said live animal.

8. The method of claim 6, wherein the step of entering comprises inputting said alphanumeric number into said microprocessor-controlled programmable device using a keyboard or other input device.

9. The method of claim 6, further comprising displaying the livestock information on said display device substantially simultaneously with said alphanumeric number.

10. The method of claim 1 wherein said display device is a large display device that obviates a need for the animal handler to physically communicate an instruction to a second animal handler.

11. The method of claim 1 further comprising the step of indicating to a second animal handler when the task has been completed.

12. A system for managing livestock information, comprising:
a unique identifier for distinguishing a live animal;
a microprocessor-controlled programmable device for entering said identifier in order to start a record for said live animal and for recording and storing information pertaining to said live animal into said record;
a global animal management server for processing said information to create a task to be performed to said live animal; and
a display device for indicating to an animal handler in data strings the task to be performed next on said live animal.

13. The system of claim 12, wherein said identifier visually identifies said live animal and does not contain any electronic or electrical components.

14. The system of claim 13, wherein said microprocessor-controlled programmable device comprises a microphone and speech recognition software for receiving said identifier spoken into said microphone and for converting the spoken identifier into computer-accessible information to be stored in said microprocessor-controlled programmable device to start said record for said live animal.

15. The system of claim 13, wherein said microprocessor-controlled programmable device includes a keyboard or other input device for inputting said identifier.

16. The system of claim 11, wherein said identifier is comprised of an electronic transponder for supplying an alphanumeric number in response to radio frequency excitation.

17. The system of claim 16, wherein said display device displays said alphanumeric number to be entered into said microprocessor-controlled programmable device.

18. The system of claim 17, wherein said alphanumeric number is spoken into said microprocessor-controlled programmable device comprising a microphone and speech recognition software, such that the spoken alphanumeric number is converted into computer-accessible information and stored in said microprocessor-controlled programmable device to start said record for said live animal.

19. The system of claim 17, wherein said alphanumeric number is input into said microprocessor-controlled programmable device using a keyboard or other input device.

20. The system of claim 17, wherein said display device displays the livestock information substantially simultaneously with said alphanumeric number.

21. The system of claim 12 wherein said display device is a large display device that obviates a need for the animal handler to physically communicate an instruction to a second animal handler.

22. A method for managing livestock information, comprising:
providing a live animal with a unique identifier;
entering said identifier into a microprocessor-controlled programmable device to start a record for said live animal;
recording and storing information pertaining to said live animal into said record, wherein the steps of entering and/or recording comprise speaking said identifier and/or information into said microprocessor-controlled programmable device through a microphone connected thereto and interpreting the speech with speech recognition software, such that the spoken identifier and/or information is converted into computer-accessible information and stored in said microprocessor-controlled programmable device;
processing said information to create a task to be performed to said live animal; and
indicating the task to be performed next on said live animal to an animal handler using an electronic unit.

23. A system for managing livestock information, comprising:
a unique identifier for distinguishing a live animal;
a microprocessor-controlled programmable device for entering said identifier in order to start a record for said live animal and for recording and storing information pertaining to said live animal into said record;
a global animal management server for processing said information to create a task to be performed to said live animal;
an electronic unit for indicating to an animal handler the task to be performed next on said live animal; and
a microphone and speech recognition software for receiving said identifier spoken into said microphone and for converting the spoken identifier into computer-accessible information to be stored in said microprocessor-controlled programmable device to start said record for said live animal.

* * * * *